United States Patent
Koshina

(10) Patent No.: US 7,682,746 B2
(45) Date of Patent: Mar. 23, 2010

(54) NEGATIVE ELECTRODE FOR NON-AQUEOUS SECONDARY BATTERY

(75) Inventor: Hizuru Koshina, Palo Alto, CA (US)

(73) Assignee: Panasonic Corporation, Osaka (JP)

( * ) Notice: Subject to any disclaimer, the term of this patent is extended or adjusted under 35 U.S.C. 154(b) by 1170 days.

(21) Appl. No.: 11/095,370

(22) Filed: Mar. 31, 2005

(65) Prior Publication Data

US 2006/0222950 A1 Oct. 5, 2006

(51) Int. Cl.
*H01M 4/48* (2006.01)

(52) U.S. Cl. ............... 429/231.1; 429/231.2; 429/231.5; 429/231.6; 429/231.95; 429/224; 429/233; 429/232; 429/218.1

(58) Field of Classification Search .............. 429/231.1, 429/231.2, 231.5, 231.6, 231.95, 224, 233, 429/232, 218.1
See application file for complete search history.

(56) References Cited

U.S. PATENT DOCUMENTS

| | | | |
|---|---|---|---|
| 5,378,560 A | 1/1995 | Tomiyama et al. | |
| 5,401,599 A | 3/1995 | Tahara et al. | |
| 5,478,671 A | 12/1995 | Idota | |
| 5,478,673 A | 12/1995 | Funatsu | |
| 5,700,598 A | 12/1997 | Denis et al. | |
| 5,780,181 A | 7/1998 | Idota et al. | |
| 6,071,645 A * | 6/2000 | Biensan et al. | 429/231.95 |

FOREIGN PATENT DOCUMENTS

| | | |
|---|---|---|
| EP | 0-594-965 A | 5/1994 |
| EP | 0-762-521 A | 3/1997 |
| JP | 06-275269 | 9/1994 |
| JP | 2001-199728 | 7/2001 |
| JP | 2001-220124 | 8/2001 |
| JP | 2001-302250 | 10/2001 |
| JP | 2003-242972 | 8/2003 |
| JP | 2003-308837 | 10/2003 |

OTHER PUBLICATIONS

Leroux, F., et al, Uptake of Lithium by Layered Molybdenum Oxide and its Tin Exchanged Derivatives: High Volumetric Capacity Materials, Solid State Ionics, vol. 133, No. 1-2, Aug. 1, 2000, pp. 37-50, North Holland Pub. Company, Amsterdam, NL.

* cited by examiner

*Primary Examiner*—Laura S Weiner
(74) *Attorney, Agent, or Firm*—RatnerPrestia

(57) ABSTRACT

Negative electrodes and non-aqueous secondary batteries that comprise the negative electrodes are disclosed. The electrode comprises a current collector; and a mixture on the current collector, the mixture comprising a negative electrode active material, a conductive material, and a binder. The active material has the overall composition: $AM^1_q M^2_{1-q} O_y$; in which (1) A is $Li_X$ or $Li_{X-r}G_r$, in which G is selected from Na, K, Cs, Be, Mg, Ca, Sr, Ba, and mixtures thereof, in which G and $M^1$ are different; (2) $0 \leq x \leq 3$; $0 < y \leq 3$; $0 \leq q \leq 1$; and $0 \leq r \leq 3$; and (3) either $M^1$ is selected from Sn, Mg, and mixtures thereof, and $M^2$ is selected from V, Ti, Nb, Mn, Cr, Sb, Mo, Zr, W, and mixtures thereof; or $M^1$ is selected from Y, Co, and mixtures of two or more of Y, Co, Sn, and Mg, and $M^2$ is selected from Ti, Nb, Mn, Cr, Sb, Mo, Zr, W, and mixtures thereof.

32 Claims, 1 Drawing Sheet

NEGATIVE ELECTRODE FOR NON-AQUEOUS SECONDARY BATTERY

FIELD OF THE INVENTION

The present invention relates to non-aqueous secondary batteries and more particularly to a negative electrode for use in a non-aqueous secondary battery and to a method for producing the same.

BACKGROUND OF THE INVENTION

In recent years, electronic information devices, such as personal computers, cell phones, and personal digital assistants (PDA), as well as audio-visual electronic devices, such as video camcorders and mini-disc players, are rapidly becoming smaller, lighter in weight, and cordless. Secondary batteries having high energy density are increasingly in high demand as power sources these electronic devices. Therefore, non-aqueous electrolyte secondary batteries, having higher energy density than obtainable by conventional lead-acid batteries, nickel-cadmium storage batteries, or nickel-metal hydride storage batteries, have come into general use. Among non-aqueous electrolyte secondary batteries, lithium-ion secondary batteries, and lithium-ion polymer secondary batteries are under advanced development.

A non-aqueous electrolyte normally selected is one capable of withstanding oxidation at a positive electrode that discharges at a high potential of 3.5 to 4.0 V and also is capable of enduring a reduction at a negative electrode that charges and discharges at a potential close to that of lithium. Typically, a non-aqueous electrolyte is obtained by dissolving lithium hexafluorophosphate ($LiPF_6$) in a mixed solvent of ethylene carbonate (EC), having a high dielectric constant, and a linear as a low viscosity solvent. Linear carbonates, include, for example, diethyl carbonate (DEC), dimethyl carbonate (DMC), ethyl methyl carbonate (EMC), and similar carbonates. For polymer secondary batteries, gel electrolytes that comprise these non-aqueous electrolytes are retained in polymer elements known as plasticizers.

Transition metal oxides have been used as positive electrode active materials for non-aqueous secondary batteries. These metal oxides have an average discharge potential in the range of 3.5 to 4.0 V with respect to lithium. Transition metal oxides that have been used include, for example, lithium cobalt oxide ($LiCoO_2$), lithium nickel oxide ($LiNiO_2$), lithium manganese oxide ($LiMnO_2$), and a solid solution material ($LiCo_aNi_bMn_cO_2$, $Li(Co_aNi_bMn_c)_2O_4$). The positive electrode active material is mixed with the conductive agent and a binder to form the positive electrode active material mixture. The positive electrode active material mixture is applied on a current collector sheet made of an aluminum foil or is compression-molded on a sealing plate made of titanium or stainless steel, to produce a positive electrode.

A carbon material capable of absorbing and desorbing lithium has been used as the negative electrode active material in these batteries. Typical carbon materials are artificial graphite, natural graphite, baked mesophase carbons made from coal pitch or petroleum pitch, non-graphitizable carbons made by further baking those baked carbons in the presence of oxygen, and non-graphitizable carbons comprising baked bodies of oxygen-containing plastics. The carbon material is mixed with a binder and the like to be used as a negative electrode material mixture. The negative electrode material mixture is applied on a current collector sheet made of a copper foil or compression-molded on a sealing plate or in a battery case, which is made of iron or nickel, to produce a negative electrode.

When a graphite material is used as the negative electrode active material, lithium is released at an average potential of about 0.2 V. Because this potential is low compared to non-graphite carbon, graphite carbon has been used in applications where high voltage and voltage flatness are desired. However, the capacity per unit volume of the graphite material is as small as 838 mAh/cm$^3$, and this capacity cannot be expected to further increase.

Negative electrode active materials showing high capacity include simple substances such as silicon and tin and oxides of those substances, which are capable of absorbing and desorbing lithium. See, for example, Japanese Laid-Open Patent Publication No. 2001-220124. However, when these materials absorb lithium ions, the crystal structure thereof varies and the volume increases. This may cause cracking of a particle, separation of a particle from the current collector, or the like, so that materials have the disadvantage of a short charge/discharge cycle life. In particular, the cracking of the particle causes an increase in reaction between the non-aqueous electrolyte and the active material, to form a film on the particle. This causes interface resistance to increase, reducing the charge/discharge cycle life of the battery.

When the battery case has low strength, such as a prismatic case made of aluminum or iron, or an exterior component which is made of an aluminum foil having a resin film on each face thereof (i.e., an aluminum laminate sheet), the battery thickness increases due to volume expansion of the negative electrode, such that an instrument storing the battery could be damaged. In a cylindrical battery using a battery case with high strength, because the separator between a positive electrode and a negative electrode is strongly compressed due to volume expansion of the negative electrode, an electrolyte-depleting region is created between the positive electrode and the negative electrode, thereby making the battery life even shorter.

Expansion per volume of the negative electrode can be reduced by blending nickel silicide ($NiSi_2$), zinc, cadmium or the like, which are capable of absorbing a zero or small amount of lithium, into a material capable of absorbing lithium. However, such blending is not an effective measure against the increase in volume because the amount of lithium absorbed in the entire electrode plate, i.e. charging capability, decreases.

On the other hand, there are other useful oxide materials in oxide, specifically lithium titanium oxide ($Li_4Ti_5O_{12}$), which is a well-known material that has a characteristic of non-expansion during lithium absorbing and desorbing. But this material has a potential of 1.55V at lithium desorbing and about 610 mAh/cm$^3$ as volumetric capacity. As an anode material, $Li_4Ti_5O_{12}$ has a cathodic desorbing potential and smaller volumetric capacity than those of graphite. Also $WO_z$ and $MoO_z$ are well-known anode materials, but these materials have large volume changes during the lithium absorbing and desorbing reaction.

It is necessary for the active material of the negative electrode to have a the characteristic of minimal volume change during lithium absorbing and desorbing, high volumetric capacity and a high potential verses lithium metal.

SUMMARY OF THE INVENTION

In one aspect, the invention is a negative electrode for a non-aqueous secondary battery that provides improved performances with respect to gas evolution and self-heating. The negative electrode comprises:
a current collector; and
on the current collector, a mixture comprising a negative electrode active material, a conductive material, and a binder;
in which:
the negative electrode active material has the overall composition:
$AM^1_q M^2_{1-q} O_y$;
A is $Li_X$ or $Li_{X-r} G_r$, in which G is selected from the group consisting of Na, K, Cs, Be, Mg, Ca, Sr, Ba, and mixtures thereof, in which G and $M^1$ are different;
$0 \leq x \leq 3$; $0 < y \leq 3$; $0 \leq q \leq 1$; and $0 \leq r \leq 3$; and
either $M^1$ is selected from the group consisting of Sn, Mg, and mixtures thereof, and $M^2$ is selected from the group consisting of V, Ti, Nb, Mn, Cr, Sb, Mo, Zr, W, and mixtures thereof; or $M^1$ is selected from the group consisting of Y, Co, and mixtures of two or more of Y, Co, Sn, and Mg, and $M^2$ is selected from the group consisting of Ti, Nb, Mn, Cr, Sb, Mo, Zr, W, and mixtures thereof.

In another aspect, the invention is a non-aqueous electrolyte secondary battery comprising:
a positive electrode;
a negative electrode;
a non-aqueous electrolyte between the positive electrode and the negative electrode;
in which:
the non-aqueous electrolyte comprises a non-aqueous solvent and lithium salt;
the positive electrode comprises a positive electrode current collector, and, on the positive electrode current collector, a mixture comprising a positive electrode active material, a positive electrode conductive material, and a positive electrode binder;
the positive electrode active material is a compound capable of occluding and of releasing lithium ions; and
the negative electrode comprises a negative electrode current collector, and on the negative electrode current collector, a mixture comprising the negative electrode active material, a negative electrode conductive material, and a negative electrode binder.

DETAILED DESCRIPTION OF THE INVENTION

Figure 1:
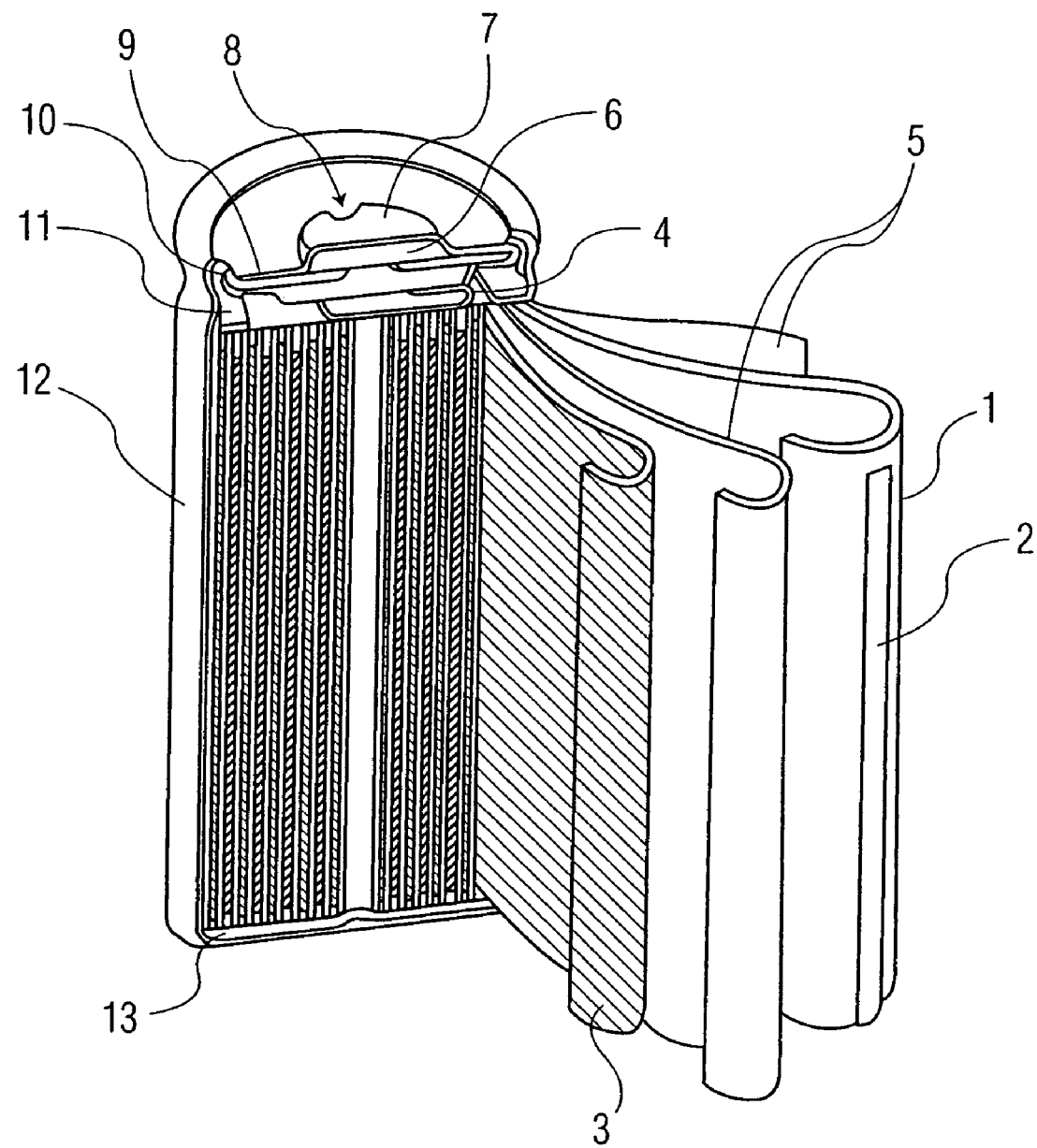
FIG. 1 is a schematic drawing of a non-aqueous electrolyte secondary battery.

Unless the context indicates otherwise, in the specification and claims, the terms $M^1$, $M^2$, binder, conductive material, negative electrode active material, positive electrode active material, lithium salt, non-aqueous solvent, additive, and similar terms also include mixtures of such materials. Unless otherwise specified, all percentages are percentages by weight and all temperatures are in degrees Centigrade (degrees Celsius).

Referring to FIG. 1, the non-aqueous secondary battery comprises negative electrode 1, negative lead tab 2, positive electrode 3, positive lead tab 4, separator 5, safety vent 6, top 7, exhaust hole 8, PTC (positive temperature coefficient) device 9, gasket 10, insulator 11, battery case or can 12, and insulator 13. Although the non-aqueous secondary battery is illustrated as cylindrical structure, any other shape, such as prismatic, aluminum pouch, or coin type may be used.

Negative Electrode

Negative electrode 1 comprises a negative electrode current collector and, on the current collector, a mixture comprising a negative electrode active material, a conductive material, and a binder.

The negative electrode current collector can be any conductive material that does not chemically change within the range of charge and discharge electric potentials used. Typically, the current collector is a metal such as copper, nickel, iron, titanium, or cobalt; an alloy comprising at least one of these metals such as stainless steel; or copper or stainless steel surface-coated with carbon, nickel or titanium. The current collector may be, for example, a film, a sheet, a mesh sheet, a punched sheet, a lath form, a porous form, a foamed form, a fibrous form, or, preferably, a foil. A foil of copper or a copper alloy, or a foil having a copper layer deposited on its surface by, for example electrolytic deposition, is preferred. The current collector is typically about 1-500 μm thick. It may also be roughened to a surface roughness of Ra is 0.2 μm or more to improved adhesion of the mixture of the negative electrode active material, the conductive material, and the binder to the current collector.

The negative electrode active material has the overall composition:
$AM^1_q M^2_{1-q} O_y$.
$0 \leq x \leq 3$; $0 < y \leq 3$; and $0 \leq q \leq 1$.
A is $Li_X$ or $Li_{X-r} G_r$, in which G is selected from the group consisting of Na, K, Cs, Be, Mg, Ca, Sr, Ba, and mixtures thereof, in which G and $M^1$ are different, and $0 \leq r \leq 3$.

x may be, for example, an integer, such as 1, 2, or 3, or it may have an intermediate, non-integral value. In one aspect, for example, x may be 2 or about 2. When G is present, (x+r) may be, for example, 2 or about 2. q may be, for example, about 0.5 or less, less than about 0.5, about 0.2 or less, less than about 0.2, or about 0.1. In one aspect, $0 \leq r < 3$, for example, r may be about 0.25 to about 0.5.

Either $M^1$ is selected from the group consisting of Sn and Mg; and $M^2$ is selected from the group consisting of V, Ti, Nb, Mn, Cr, Sb, Mo, and Zr; or $M^1$ is selected from the group consisting of Y and Co; and $M^2$ is selected from the group consisting of Ti, Nb, Mn, Cr, Sb, Mo, and Zr.

The negative electrode active material may be a single material that has the indicated composition. Alternatively, it may be a mixture of material that has the indicated overall composition.

Negative electrode active materials, such as $LiSn_q Ti_{(1-q)} O_3$, $LiCo_q Ti_{(1-q)} O_3$, $LiMg_q Ti_{(1-q)} O_3$, and $LiY_q Ti_{(1-q)} O_3$, etc., may be prepared by mixing lithium carbonate, the carbonate of $M^1$ (e.g., tin carbonate, cobalt carbonate, magnesium carbonate, yttrium, carbonate, etc.), and the oxide of $M^2$ (e.g., titanium oxide, vanadium oxide, niobium oxide, manganese oxide, chromium oxide, antimony oxide, etc.) and heating the resulting mixture, such as in an aluminum oxide boat at about 600° C. for about 12 hr.

At least part of the surface of the negative electrode active material is covered with a conductive material. Any conductive material know in the art can be used. Typical conductive materials include carbon, such as graphite, for example, natural graphite (scale-like graphite), synthetic graphite, and expanding graphite; carbon black, such as acetylene black, KETZEN® black (highly structured furnace black), channel black, furnace black, lamp black, and thermal black; conductive fibers such as carbon fibers and metallic fibers; metal powders such as copper and nickel; organic conductive materials such as polyphenylene derivatives; and mixtures thereof. Synthetic graphite, acetylene black, and carbon fibers are preferred. The negative electrode active material can be coated with a conductive material, such as carbon black, by hybridization using hybridization equipment.

The binder for the negative electrode can be either a thermoplastic resin or a thermosetting resin. Useful binders include: polyethylene, polypropylene, polytetrafluoroethylene (PTFE), polyvinylidene fluoride (PVDF), styrene/butadiene rubber, tetrafluoroethylene/hexafluoropropylene copolymers (FEP), tetrafluoroethylene/perfluoro-alkyl-vinyl ether copolymers (PFA), vinylidene fluoride/hexafluoropropylene copolymers, vinylidene fluoride/chlorotrifluoroethylene copolymers, ethylene/tetrafluoroethylene copolymers (ETFE), polychlorotrifluoroethylene (PCTFE), vinylidene fluoride/pentafluoropropylene copolymers, propylene/tetrafluoroethylene copolymers, ethylene/chlorotrifluoroethylene copolymers (ECTFE), vinylidene fluoride/hexafluoropropylene/tetrafluoroethylene copolymers, vinylidene fluoride/perfluoromethyl vinyl ether/tetrafluoroethylene copolymers, and mixtures thereof. Polytetrafluoroethylene and polyvinylidene fluoride are preferred binders.

The negative electrode may be prepared by mixing the negative electrode active material, the binder, and the conductive material with a solvent, such as N-methylpyrrolidone. The resulting paste or slurry is coated onto the current collector by any conventional coating method, such bar coating, gravure coating, die coating, roller coating, or doctor knife coating. Typically, the current collector is dried to remove the solvent and then rolled under pressure after coating. The mixture of negative electrode active material, binder, and conductive material typically comprises the negative electrode active material, at least enough conductive material for good conductivity, and at least enough binder to hold the mixture together. The negative electrode active material may typically comprise from about 1 wt % to about 99 wt % of the mixture of negative electrode active material, binder, and conductive material.

Positive Electrode

Positive electrode 3 typically comprises a positive electrode current collector and, on the positive electrode current collector, a mixture comprising a positive electrode active material, a conductive material, and a binder. Typical positive electrode current collectors, positive electrode conductive materials, and positive electrode binders include the positive electrode current collectors, positive electrode conductive materials, and positive electrode binders described above.

The positive electrode active material may any compound containing lithium that is capable of occluding and of releasing lithium ions ($Li^+$). A transition metal oxide, with an average discharge potential in the range of 3.5 to 4.0 V with respect to lithium, has typically been used. As the transition metal oxide, lithium cobalt oxide ($LiCoO_2$), lithium nickel oxide ($LiNiO_2$), lithium manganese oxide ($LiMn_2O_4$), a solid solution material ($LiCo_aNi_bMn_cO_2$, $Li(Co_cNi_dMn_e)_2O_4$) with a plurality of transition metals introduced thereto, and the like, have been used. The average diameter of particles of the positive electrode active material is preferably about 1-30 µm.

The positive electrode can be prepared by mixing the positive electrode active material, the positive electrode binder, and the positive electrode conductive material with a solvent and coating the resulting slurry on the positive electrode current collector as was described for preparation of the negative electrode.

In the non-aqueous electrolyte secondary battery, preferably at least a surface of the negative electrode having the mixture comprising the negative electrode material is facing a surface of the positive electrode having the mixture comprising the positive electrode material.

Non-Aqueous Electrolyte and Separator

The non-aqueous electrolyte is typically capable of withstanding a positive electrode that discharges at a high potential of 3.5 to 4.0 V and also capable of withstanding a negative electrode that charges and discharges at a potential close to lithium. The non-aqueous electrolyte comprises a non-aqueous solvent, or mixture of non-aqueous solvents, with a lithium salt or a mixture of lithium salts dissolved therein.

Typical non-aqueous solvents include, for example, cyclic carbonates as ethylene carbonate (EC), propylene carbonate (PC), dipropylene carbonate (DPC), butylene carbonate (BC), vinylene carbonate (VC), phenyl ethylene carbonate (ph-EC), and vinyl ethylene carbonate (VEC); open chain carbonates as dimethyl carbonate (DMC), diethyl carbonate (DEC), ethylmethyl carbonate (EMC); amides, such as formamide, acetamide, and N,N-dimethyl formamide; aliphatic carboxylic acid esters such as methyl formate, ethyl formate, methyl acetate, ethyl acetate, methyl propionate and ethyl propionate; diethers, such as 1,2-dimethoxyethane (DME), 1,2-diethoxyethane (DEE), and ethoxymethoxyethane (EME); cyclic ethers such as tetrahydrofuran, 2-methyl tetrahydrofuran, and dioxane; other aprotic organic solvents, such as acetonitrile, dimethyl sulfoxide, 1,3-propanesulton (PS) and nitromethane; and mixtures thereof. Typical lithium salts include, for example, lithium chloride (LiCl), lithium bromide (LiBr), lithium trifluoromethyl acetate ($LiCF_3CO_2$), lithium hexafluorophosphate ($LiPF_6$), lithium perchlorate ($LiClO_4$), lithium tetrafluoroborate ($LiBF_4$), lithium trifluoromethane sulfonate ($LiCF_3SO_3$), lithium hexafluoroarsenate ($LiAsF_6$), bis(trifluoromethyl)sulfonylimido lithium [$LiN(CF_3SO_2)_2$], lithium bisoxalato borate ($LiB(C_2O_4)_2$), and mixtures thereof.

Preferably, the non-aqueous electrolyte is one obtained by dissolving lithium hexafluorophosphate ($LiPF_6$) in a mixed solvent of ethylene carbonate (EC), which has a high dielectric constant, and a linear carbonate or mixture of linear carbonates that are low-viscosity solvents, such as, for example, diethyl carbonate (DEC), dimethyl carbonate (DMC), ethyl methyl carbonate (EMC). The concentration of lithium ion in the non-aqueous electrolyte is typically about 0.2 mol/l to about 2 mol/l, preferably about 0.5 mol/l to about 1.5 mol/l.

Other compounds may be added to the non-aqueous electrolyte in order to improve discharge and charge/discharge properties. Such compounds include triethyl phosphate, triethanolamine, cyclic ethers, ethylene diamine, pyridine, triamide hexaphosphate, nitrobenzene derivatives, crown ethers, quaternary ammonium salts, and ethylene glycol di-alkyl ethers.

Separator 5 is insoluble and stable in the electrolyte solution. It prevents short circuits by insulating the positive electrode from the negative electrode. Insulating thin films with fine pores, which have a large ion permeability and a predetermined mechanical strength, are used. Polyolefins, such as polypropylene and polyethylene, and fluorinated polymers such as polytetrafluoroethylene and polyhexafluoropropylene, can be used individually or in combination. Sheets, non-wovens and wovens made with glass fiber can also be used. The diameter of the fine pores of the separators is typically small enough so that positive electrode materials, negative electrode materials, binders, and conductive materials that separate from the electrodes can not pass through the separator. A desirable diameter is, for example, 0.01-1 μm. The thickness of the separator is generally 10-300 μm. The porosity is determined by the permeability of electrons and ions, material and membrane pressure, in general however, it is desirably 30-80%.

For polymer secondary batteries, gel electrolytes comprising these non-aqueous electrolytes retained in the polymer as plasticizers, have also been used. Alternatively, the electrolyte may be polymer solid electrolyte or gel polymer electrolyte, which comprises a polymer solid electrolyte mixed with organic solvent provided as a plasticizer. Effective organic solid electrolytes include polymer materials such as derivatives, mixtures and complexes of polyethylene oxide, polypropylene oxide, polyphosphazene, polyaziridine, polyethylene sulfide, polyvinyl alcohol, polyvinylidene fluoride, polyhexafluoropropylene. Among inorganic solid electrolytes, lithium nitrides, lithium halides, and lithium oxides are well known. Among them, $Li_4SiO_4$, $Li_4SiO_4$—LiI—LiOH, $zLi_3PO_4$-$(1-z)Li_4SiO_4$, $Li_2SiS_3$, $Li_3PO_4$—$Li_2S$—$SiS_2$ and phosphorus sulfide compounds are effective. When a gel electrolyte is used, a separator is typically not necessary.

The positive electrode, the negative electrode, and the electrolyte are contained in a battery case or can. The case may be made of example, titanium, aluminum, or stainless steel that is resistant to the electrolyte. As shown in FIG. 1, the a non-aqueous secondary battery may also comprise lead tabs, safety vents, insulators, and other structures.

INDUSTRIAL APPLICABILITY

This invention provides a negative electrode for a non-aqueous secondary battery and a non-aqueous secondary battery of high reliability and safety. These non-aqueous secondary batteries are used in portable electronic devices such as personal computers, cell phones and personal digital assistants, as well as audio-visual electronic devices, such as video camcorders and mini-disc players. They may also be used in high power applications such as hybrid vehicles and power tools, as well as in electric vehicles, uninterruptible power sources, and memory backup applications.

The advantageous properties of this invention can be observed by reference to the following examples, which illustrate but do not limit the invention.

EXAMPLES

Preparation of the Negative Electrode Active Materials

Negative electrode active materials, such as $LiSn_qTi_{(1-q)}O_3$, $LiCo_qTi_{(1-q)}O_3$, $LiMg_qTi_{(1-q)}O_3$ and $LiY_qTi_{(1-q)}O_3$, were synthesized by the following procedure. To prepare $LiSn_qTi_{(1-q)}O_3$, lithium carbonate, tin carbonate and titanium oxide was mixed well. This mixture was put on aluminum oxide boat and heated at 600° C. for 12 hr. $LiCo_qTi_{(1-q)}O_3$, $LiMg_qTi_{(1-q)}O_3$ and $LiY_qTi_{(1-q)}O_3$ were synthesized by the same method using with cobalt carbonate, magnesium carbonate and yttrium carbonate respectively. Also, $LiSn_qV_{(1-q)}O_3$, $LiCo_qV_{(1-q)}O_3$, $LiMg_qV_{(1-q)}O_3$, $LiY_qV_{(1-q)}O_3$ were synthesized by the following procedure. To prepare $LiSn_qV_{(1-q)}O_3$, lithium carbonate, tin carbonate and vanadium oxide was mixed well. This mixture was put on aluminum oxide boat and heated at 600° C. for 12 hr. To prepare $LiSn_qNb_{(1-q)}O_3$, $LiSn_qMn_{(1-q)}O_3$, $LiSn_qCr_{(1-q)}O_3$, and $LiSn_qSb_{(1-q)}O_3$, niobium oxide, manganese oxide, chromium oxide, antimony oxide were prepared respectively in replace of above titanium oxide and vanadium oxide. These synthesis method were the same as $LiSn_qTi_{(1-q)}O_3$ after mixing.

Negative electrode active materials, such as $Li_2Sn_qTi_{(1-q)}O_3$, $Li_2CO_qTi_{(1-q)}O_3$, $Li_2Mg_qTi_{(1-q)}O_3$ and $Li_2Y_qTi_{(1-q)}O_3$, were synthesized by the following procedure. To prepare $Li_2Sn_qTi_{(1-q)}O_3$, lithium carbonate, tin carbonate and titanium oxide was mixed well. This mixture was put on aluminum oxide boat and heated at 600° C. for 12 hr. $Li_2Co_qTi_{(1-q)}O_3$, $Li_2Mg_qTi_{(1-q)}O_3$ and $Li_2Y_qTi_{(1-q)}O_3$ were synthesized by the same method using with cobalt carbonate, magnesium carbonate and yttrium carbonate respectively. Also, $Li_2Sn_qZr_{(1-q)}O_3$, $Li_2Co_qZr_{(1-q)}O_3$, $Li_2Mg_qZr_{(1-q)}O_3$, $Li_2Y_qZr_{(1-q)}O_3$ were synthesized by the following procedure. To prepare $Li_2Sn_qZr_{(1-q)}O_3$, lithium carbonate, tin carbonate and zirconium oxide was mixed well. This mixture was put on aluminum oxide boat and heated at 600° C. for 12 hr. To prepare $Li_2CO_qNb_{(1-q)}O_3$, $Li_2CO_qMo_{(1-q)}O_4$ and $Li_2Co_qW_{(1-q)}O_4$, niobium oxide, molybdenum oxide and tungsten oxide were prepared respectively in replace of above titan oxide and zirconium oxide. These synthesis method were the same as $Li_2Sn_qTi_{(1-q)}O_3$ after mixing.

To make $Li_{2/3}K_{1/3}Co_qW_{(1-q)}O_4$ and $Li_{2/3}Mg_{1/3}Co_qW_{(1-q)}O_4$, a mixture of lithium carbonate, potassium carbonate, cobalt carbonate, magnesium carbonate and tungsten oxide was prepared. These synthesis method were the same as $Li_2Sn_qTi_{(1-q)}O_3$ after mixing.

The values for q are given in Table 1 and in Table 2.

Preparation of Batteries

The batteries were prepared by the following procedure. FIG. 1 shows schematic drawing of a battery of the invention. The cell dimensions were 17 mm in diameter and 50 mm in height. Cell capacity was about 600 mAh, estimated from the positive electrode.

Negative electrode 1 of this invention was produced by the following procedure. At first, the negative electrode active material(s), carbon black as a conductive material, polyvinyl difluoride (or polyfluoro vinylidene) (PVdF) binder, and N-methylpyrolidone (NMP) solvent were mixed well. The weight ratio of negative electrode active material to conductive material to binder was 100:10:5 (when the binder was PVdF). The resulting mixture was coated both sides of a 10 micrometer thick copper foil with a doctor blade, dried at 80° C. for 4 hr, and calendared to a thickness of 150 micrometer.

Positive electrode 3 comprises lithium cobalt oxide ($LiCoO_2$) as the positive electrode active material, acetylene black as the conductive material, PVdF as the binder, and aluminum foil as the current collector. PVdF was used as 10% NMP solution. The weight ratio of positive electrode active material to conductive material to binder was 100:3:4 after drying. These materials were mixed well, and the resulting paste coated on both sides of aluminum foil 15 micrometer thick, dried at 80° C. for 4 hr, and calendared to a thickness 200 micrometer.

Negative electrode 1 and positive electrode 3 were wound with a 25 micrometer thick microporous polyethylene membrane separator 5. When the electrodes were wound, the edge of positive electrode 3 was kept 0.5 mm inside of negative electrode 1. Then the wound electrode was dried under vacuum at 60° C. for 12 hr to reduce the water concentration less than 50 ppm. Nickel negative lead tab 2 was attached to the copper foil current collector and another edge of tab 2 was attached to the inside bottom of can 12 before drying. An aluminum positive lead tab 4 was attached to the aluminum foil current collector, and another edge of tab 4 was attached to top 7 before drying. Lithium hexafluorophosphate (LiPF$_6$) lithium salt dissolved in a non-aqueous solvent comprising a 1:1 (volume to volume) mixture of propylene carbonate (PC) and dimethyl carbonate (DMC) was used as the non-aqueous electrolyte. After the non-aqueous electrolyte was poured into the can, top 7 was crimped to can 12.

Battery Evaluation Procedure

The gas evolution on first charging of a battery and self-heat at high temperature were measured by following method. Batteries A1-P1 and A2-S2 were charged at 120 mA under 80° C. to 4.2V. And then these batteries were disassembled in non-aqueous propylene carbonate. The generated gases from each battery were collected in a mess cylinder. To measure the temperature change, batteries A1-P1 and A2-S2 were stored in hot box at 100° C. for 5 hr. The temperature of the cell was measured by the thermocouple settled on the surface of battery. This differential temperature was considered to cause the self-heating reaction in the battery. The results are given in Table 1 and in Table 2.

Example 1

$Li_xSn_qTi_{(1-q)}O_3$ was used as a negative electrode active material. The resulting battery cell was referred to as Battery A1.

Example 2

$Li_xCO_qTi_{(1-q)}O_3$ was used as a negative electrode active material. The resulting battery cell was referred to as Battery B1.

Example 3

$Li_xY_qTi_{(1-q)}O_3$ was used as a negative electrode active material. The resulting battery cell was referred to as Battery C1.

Example 4

$Li_xMg_qTi_{(1-q)}O_3$ was used as a negative electrode active material. The resulting battery cell was referred to as Battery D1.

Example 5

$Li_xMg_qTi_{(1-q)}O_3$ coated with carbon black by hybridization equipment was used as the negative electrode active material. Hybridization was carried out at 6000 rpm under an argon atmosphere. The ratio of $Li_xMg_qTi_{(1-q)}O_3$ and carbon black was 90:10 by weight. The resulting battery cell was referred to as Battery E1.

Example 6

$Li_xSn_qV_{(1-q)}O_3$ was used as a negative electrode active material. The resulting battery cell was referred to as Battery F1.

Example 7

$Li_xMg_qV_{(1-q)}O_3$ was used as a negative electrode active material. The resulting battery cell was referred to as Battery G1.

Example 8

The conditions and materials were as same as Example 7 except that the electrolyte was LiPF$_6$/PC+DMC including vinylene carbonate. The resulting battery cell was referred to as Battery H1.

Example 9

The conditions and materials were as same as Example 7 except that the electrolyte was LiPF$_6$/PC+DMC including vinylene carbonate and 1,3-propanesulton. The resulting battery cell was referred to as Battery I1.

Example 10

$Li_xSn_qNb_{(1-q)}O_3$ was used as a negative electrode active material. The resulting battery cell was referred to as Battery J1.

Example 11

$Li_xSn_qMn_{(1-q)}O_3$ was used as a negative electrode active material. The resulting battery cell was referred to as Battery K1.

Example 12

$Li_xSn_qCr_{(1-q)}O_3$ was used as a negative electrode active material. The resulting battery cell was referred to as Battery L1.

Example 13

$Li_xSn_qSb_{(1-q)}O_3$ was used as a negative electrode active material. The resulting battery cell was referred to as Battery M1.

Comparative Example 1

Graphite powder was used as negative electrode active material. The resulting battery cell was referred to as Battery N1.

Comparative Example 2

$Li_xTiO_3$ was used as negative electrode active material. The resulting battery cell was referred to as Battery O1.

Comparative Example 3

$Li_xNiO_3$ was used as negative electrode active material. The resulting battery cell was referred to as Battery P1.

TABLE 1

| Battery | Anode Material | Conductive material | Method$^a$ | Electrolyte Additives | Gas (cm$^3$) | Temp. Change (° C.) |
|---|---|---|---|---|---|---|
| A1 | $Li_xSn_{0.1}Ti_{0.9}O_3$ | Carbon Black | | None | 4.1 | 2 |
| B1 | $Li_xCo_{0.1}Ti_{0.9}O_3$ | Carbon Black | | None | 4.3 | 2 |

TABLE 1-continued

| Battery | Anode Material | Conductive material | Method[a] | Electrolyte Additives | Gas (cm³) | Temp. Change (° C.) |
|---|---|---|---|---|---|---|
| C1 | $Li_xY_{0.1}Ti_{0.9}O_3$ | Carbon Black | | None | 4.2 | 3 |
| D1 | $Li_xMg_{0.1}Ti_{0.9}O_3$ | Carbon Black | | None | 4.5 | 2 |
| E1 | $Li_xMg_{0.2}Ti_{0.8}O_3$ | Carbon Black | Hybridization | None | 3.9 | 2 |
| F1 | $Li_xSn_{0.2}V_{0.8}O_3$ | Carbon Black | | None | 4.4 | 2 |
| G1 | $Li_xMg_{0.1}V_{0.9}O_3$ | Carbon Black | | None | 4.3 | 2 |
| H1 | $Li_xMg_{0.1}V_{0.9}O_3$ | Carbon Black | | VC | 3.5 | 2 |
| I1 | $Li_xMg_{0.1}V_{0.9}O_3$ | Carbon Black | | VC + PS | 3.4 | 1 |
| J1 | $Li_xSn_{0.4}Nb_{0.6}O_3$ | Carbon Black | | None | 4.2 | 1 |
| K1 | $Li_xSn_{0.4}Mn_{0.6}O_3$ | Carbon Black | | None | 4.0 | 2 |
| L1 | $Li_xSn_{0.4}Cr_{0.6}O_3$ | Carbon Black | | None | 4.1 | 1 |
| M1 | $Li_xSn_{0.4}Sb_{0.6}O_3$ | Carbon Black | | None | 4.6 | 2 |
| N1 | $CLi_x$ | Carbon Black | | None | 15 | 0 |
| O1 | $Li_xTiO_3$ | Carbon Black | | None | 2.8 | 15 |
| P1 | $Li_xNiO_3$ | Carbon Black | | None | 3.1 | 17 |

[a]Mixing unless otherwise indicated.

As shown in Table 1, batteries A1-M1, using the negative electrode material of the invention, have smaller amounts of gas produced than those of the Comparative Examples batteries N1-P1. Though not being bound by any theory or explanation, it is believed that this is caused by the graphite material reacting with solvents of PC (propylene carbonate) and DMC (dimethyl carbonate) on charging. Though not being bound by any theory or explanation, it is believed that the $Li_xTiO_3$ and $Li_xNiO_3$ have a poor electronic conductivity, which causes a reaction that produces electrodeposition of lithium on the surface.

In contrast to batteries N1-P1, batteries A1-M1 had much less gas evolution. It is believed that, in these batteries, in which $M^1$ was Mg, Co, Sn, or Y, reaction with the electrolyte and with lithium in active materials is difficult because of the difference in electronic conductivity.

Batteries E1 which used $Li_xMg_qTi_{(1-q)}O_3$ surface-coated carbon black by hybridization, showed reducing gas evolution. It is believed that the conductive material, such as carbon black, prevents the negative electrode active material from contacting the electrolyte. Carbon fiber, transition metal powders, and their spherical, flake and fiber can also be used as the conductive material.

Moreover, batteries J1 and K1, using the additives vinylene carbonate (VC) and 1,3-propanesulton (PS), show the smallest volume of gas because the passivation film on the surface of the negative electrode active material reduces the contact between the active material and the electrolyte. Passivation films are believed to be formed during the initial charging. Other additives, such as phenyl ethylene carbonate (ph-EC) and vinyl ethylene carbonate (VEC), may also be used.

In Table 1, batteries A1-M1 show smaller temperature changes than those of Comparative Examples O1 and P1 These results indicate batteries A1-M1 produce less heat from exothermic reactions compared with batteries O1 and P1. Although comparative battery N1 showed no temperature change, a large amount of gas was generated during the first charge. It is believed that battery N1 could not charge and its coulomb was used to decompose the electrolyte, particularly propylene carbonate (PC). If the graphite reacts with propylene carbonate or dimethyl carbonate during charging, the lithium ion can not intercalate the graphite.

Battery cells A1-M1 each generate a small amount of heat (differential temperatures are not zero). It is believed that this heat generation is caused by the carbon black. However, these small temperatures increases should not be a problem. Thus, this invention is expected to improve the reliability and safety of the battery remarkably because the battery cell of this invention shows reduces gas evolution and heat generation compared to graphite.

Example 14

$Li_xSn_qTi_{(1-q)}O_3$ was used as a negative electrode active material. The resulting battery cell was referred to as Battery A2.

Example 15

$Li_xCo_qTi_{(1-q)}O_3$ was used as a negative electrode active material. The resulting battery cell was referred to as Battery B2.

Example 16

$Li_xY_qTi_{(1-q)}O_3$ was used as a negative electrode active material. The resulting battery cell was referred to as Battery C2.

Example 17

$Li_xMg_qTi_{(1-q)}O_3$ was used as a negative electrode active material. The resulting battery cell was referred to as Battery D2.

Example 18

$Li_xMg_qTi_{(1-q)}O_3$ coated with carbon black by hybridization equipment was used as the negative electrode active material. Hybridization was carried out at 6000 rpm under an argon atmosphere. The ratio of $Li_xMg_qTi_{(1-q)}O_3$ and carbon black was 90:10 by weight. The resulting battery cell was referred to as Battery E2.

Example 19

$Li_xSn_qZr_{(1-q)}O_3$ was used as a negative electrode active material. The resulting battery cell was referred to as Battery F2.

Example 20

$Li_xCo_qZr_{(1-q)}O_3$ was used as a negative electrode active material. The resulting battery cell was referred to as Battery G2.

Example 21

$Li_xY_qZr_{(1-q)}O_3$ was used as a negative electrode active material. The resulting battery cell was referred to as Battery H2.

Example 22

$Li_xMg_qZr_{(1-q)}O_3$ was used as a negative electrode active material. The resulting battery cell was referred to as Battery I2.

Example 23

The conditions and materials were the as same as Example 22 except that the electrolyte was $LiPF_6$/PC+DMC electrolyte including vinylene carbonate. The resulting battery cell was referred to as Battery J2.

Example 24

The conditions and materials were the as same as Example 22 except that the electrolyte was $LiPF_6$/PC+DMC electrolyte including vinylene carbonate and 1,3-propanesulton. The resulting battery cell was referred to as Battery K2.

Example 25

$Li_xCo_qNb_{(1-q)}O_3$ was used as a negative electrode active material. The resulting battery cell was referred to as Battery L2.

Example 26

$Li_xCO_qMo_{(1-q)}O_4$ was used as a negative electrode active material. The resulting battery cell was referred to as Battery M2.

Example 14

$Li_xCo_qW_{(1-q)}O_4$ was used as a negative electrode active material. The resulting battery cell was referred to as Battery N2.

Example 15

$Li_xK_{1/3}CO_qW_{(1-q)}O_4$ was used as a negative electrode active material. The resulting battery cell was referred to as Battery O2.

Example 16

$Li_xMg_{1/3}Co_qW_{(1-q)}O_4$ was used as a negative electrode active material. The resulting battery cell was referred to as Battery P2.

Comparative Example 4

Graphite powder was used as negative electrode active material. The resulting battery cell was referred to as Battery Q2. Although battery Q2 has the same negative electrode active material as battery N1, it was a different battery and may differ slightly from battery N1 because it may have been assembled under slightly different conditions.

Comparative Example 5

$Li_xTiO_3$ was used as negative electrode active material. The resulting battery cell was referred to as Battery Q2.

Comparative Example 6

$Li_xZrO_3$ was used as negative electrode active material. The resulting battery cell was referred to as Battery R2.

TABLE 2

| Battery | Active Material | Conductive material | Method[a] | Electrolyte Additives | Gas ($cm^3$) | Temp. Change (° C.) |
|---|---|---|---|---|---|---|
| A2 | $Li_2Sn_{0.1}Ti_{0.9}O_3$ | Carbon Black | | None | 4.2 | 2 |
| B2 | $Li_2Co_{0.1}Ti_{0.9}O_3$ | Carbon Black | | None | 4.1 | 2 |
| C2 | $Li_2Y_{0.1}Ti_{0.9}O_3$ | Carbon Black | | None | 4.2 | 3 |
| D2 | $Li_2Mg_{0.1}Ti_{0.9}O_3$ | Carbon Black | | None | 4.4 | 2 |
| E2 | $Li_2Mg_{0.2}Ti_{0.8}O_3$ | Carbon Black | Hybridization | None | 3.8 | 2 |
| F2 | $Li_2Sn_{0.2}Zr_{0.8}O_3$ | Carbon Black | | None | 4.4 | 2 |
| G2 | $Li_2Co_{0.2}Zr_{0.8}O_3$ | Carbon Black | | None | 4.3 | 2 |
| H2 | $Li_2Y_{0.05}Zr_{0.95}O_3$ | Carbon Black | | None | 4.1 | 2 |
| I2 | $Li_2Mg_{0.1}Zr_{0.9}O_3$ | Carbon Black | | None | 4.0 | 1 |
| J2 | $Li_2Mg_{0.1}Zr_{0.9}O_3$ | Carbon Black | | VC | 3.7 | 2 |
| K2 | $Li_2Mg_{0.1}Zr_{0.9}O_3$ | Carbon Black | | VC + PS | 3.4 | 1 |
| L2 | $Li_2Co_{0.4}Nb_{0.6}O_3$ | Carbon Black | | None | 4.5 | 2 |
| M2 | $Li_2Co_{0.4}Mo_{0.6}O_4$ | Carbon Black | | None | 4.3 | 2 |
| N2 | $Li_2CO_{0.4}W_{0.6}O_4$ | Carbon Black | | None | 4.6 | 2 |
| O2 | $Li_{5/3}K_{1/3}Co_{0.1}W_{0.9}O_4$ | Carbon Black | | None | 4.4 | 2 |
| P2 | $Li_{5/3}Mg_{1/3}Co_{0.1}W_{0.9}O_4$ | Carbon Black | | None | 4.5 | 2 |
| Q2 | $CLi_x$ | Carbon Black | | None | 15 | 0 |
| R2 | $Li_2TiO_3$ | Carbon Black | | None | 3.3 | 10 |
| S2 | $Li_2ZrO_3$ | Carbon Black | | None | 2.9 | 8 |

[a]Mixing unless otherwise indicated.

As shown in Table 2, batteries A2-P2, using the negative electrode material of the invention, have smaller amounts of gas produced than those of the Comparative Examples batteries Q2-S2. Though not being bound by any theory or explanation, it is believed that this is caused by the graphite material reacting with solvents of PC (propylene carbonate) and DMC (dimethyl carbonate) on charging. Though not being bound by any theory or explanation, it is believed that the $Li_XTiO_3$ and $Li_XZrO_3$ have a poor electronic conductivity, which causes electrodeposition of lithium on the surface.

In contrast to batteries Q2-S2, batteries A2-P2 had much less gas evolution. It is believed that, in these batteries, in which $M^1$ was Mg, Co, Sn, or Y, reaction with the electrolyte and with lithium in active materials is difficult because of the difference in electronic conductivity.

Batteries E2 which used $Li_XMg_qTi_{(1-q)}O_3$ surface-coated carbon black by hybridization, showed reducing gas evolution. It is believed that the conductive material, such as carbon black, prevents the negative electrode active material from contacting the electrolyte. Carbon fiber, transition metal powders, and their spherical, flake and fiber can also be used as the conductive material.

Moreover, batteries J2 and K2, using additives vinylene carbonate (VC) and 1,3-propanesulton (PS), show the smallest volume of gas because the passivation film on the surface of the negative electrode active material reduces the contact between the active material and the electrolyte. Passivation films are believed to be formed during the initial charging. Other additives, such as phenyl ethylene carbonate (ph-EC) and vinyl ethylene carbonate (VEC), may also be used.

In Table 2, batteries A2-P2 show smaller temperature changes than those of Comparative Examples Q2 and R2. These results indicate batteries A2-P2 produce less heat from exothermic reactions compared with battery cells R2 and S2. Although comparative battery Q2 showed no temperature change, a large amount of gas was generated during the first charge. It is believed that battery cell Q2 could not charge and its coulomb was used to decompose the electrolyte, particularly propylene carbonate (PC). If the graphite reacts with propylene carbonate or dimethylcarbonate during charging, the lithium ion can not intercalate the graphite.

Battery cells A2-P2 each generate a small amount of heat (differential temperatures are not zero). It is believed that this heat generation is caused by the carbon black. However, these small temperatures increases should not be a problem. Thus, this invention is expected to improve the reliability and safety of the battery remarkably because the battery cell of this invention shows reduces gas evolution and heat generation compared to graphite.

The examples, for example, $Li_XM^1_qTi_{(1-q)}O_3 Li_XM^1_q Zr_{(1-q)}O_3$, $Li_XM^1_qMo_{(1-q)}O_4$ ($M^1$=Sn, Co, Y and Mg), are illustrate of the performance that may be attained when $M^1$ is least one selected from these elements and from Na, K, Cs, Be, Mg, Ca, Sr, Ba, and transition metals exclusive of Ti, V, Nb, Mn, Cr, Sb, Zr, Mo, and W. Furthermore, at least one selected from Na, K, Cs, Be, Mg, Ca, Sr, and Ba may be used in place of, or in addition to, lithium.

Having described the invention, we now claim the following and their equivalents.

What is claimed:

1. A negative electrode for a non-aqueous secondary battery, the negative electrode comprising:
    a current collector; and
    a mixture on the current collector, the mixture comprising a negative electrode active material, a conductive material, and a binder;
in which:
    the negative electrode active material has the overall composition:
    $AM^1_q M^2_{1-q} O_y$;
    A is $Li_X$ or $Li_{X-r}G_r$, in which G is selected from the group consisting of Na, K, Cs, Be, Mg, Ca, Sr, Ba, and mixtures thereof, in which G and $M^1$ are different;
    $0<x\leq3$; y is 3 or 4; $0<q<1$; and $0\leq r\leq3$; and
    either $M^1$ is selected from the group consisting of Sn, Mg, and mixtures thereof, and $M^2$ is selected from the group consisting of V, Ti, Nb, Mn, Cr, Sb, Zr, W, and mixtures thereof; or $M^1$ is selected from the group consisting of Y, Co, and mixtures of two or more of Y, Co, Sn, and Mg, and $M^2$ is selected from the group consisting of Ti, Nb, Mn, Cr, Sb, Mo, Zr, W, and mixtures thereof.

2. The negative electrode of claim 1 in which $M^1$ is selected from the group consisting of Sn, Mg, and mixtures thereof; and $M^2$ is selected from the group consisting of V, Ti, Nb, Mn, Cr, Sb, Zr, W, and mixtures thereof.

3. The negative electrode of claim 2 in which A is $Li_X$.

4. The negative electrode of claim 2 in which x is about 2.

5. The negative electrode of claim 1 in which $M^1$ is selected from the group consisting of Y, Co, and mixtures of two or more of Y, Co, Sn, and Mg; and $M^2$ is selected from the group consisting of Ti, Nb, Mn, Cr, Sb, Mo, Zr, W, and mixtures thereof.

6. The negative electrode of claim 5 in which A is $Li_X$.

7. The negative electrode of claim 5 in which x is about 2.

8. The negative electrode of claim 1 in which A is $Li_X$.

9. The negative electrode of claim 8 in which $M^1$ is selected from the group consisting of Y, Co, Sn, Mg, and mixtures of two or more of Y, Co, Sn, and Mg; and $M^2$ is Ti.

10. The negative electrode of claim 8 in which $M^1$ is selected from the group consisting of Y, Co, Sn, Mg, and mixtures of two or more of Y, Co, Sn, and Mg; and $M^2$ is Zr.

11. The negative electrode of claim 8 in which $M^1$ is selected from the group consisting of Y, Co, Sn, Mg, and mixtures of two or more of Y, Co, Sn, and Mg; and $M^2$ is W.

12. The negative electrode of claim 8 in which $M^1$ is selected from the group consisting of Y, Co, Sn, Mg, and mixtures of two or more of Y, Co, Sn, and Mg; and $M^2$ is Nb.

13. The negative electrode of claim 8 in which $M^1$ is selected from the group consisting of Y, Co, Sn, Mg, and mixtures of two or more of Y, Co, Sn, and Mg; and $M^2$ is Mo.

14. The negative electrode of claim 8 in which $M^1$ is selected from the group consisting of Y, Co, Sn, Mg, and mixtures of two or more of Y, Co, Sn, and Mg; and $M^2$ is Sb.

15. The negative electrode of claim 8 in which $M^1$ is selected from the group consisting of Y, Co, Sn, Mg, and mixtures of two or more of Y, Co, Sn, and Mg; and $M^2$ is Gr.

16. The negative electrode of claim 8 in which $M^1$ is selected from the group consisting of Y, Co, Sn, Mg, and mixtures of two or more of Y, Co, Sn, and Mg; and $M^2$ is Mn.

17. The negative electrode of claim 8 in which $M^1$ is selected from the group consisting of Sn, Mg, and mixtures thereof; and $M^2$ is V.

18. The negative electrode of claim 8 in which $M^1$ is Sn.

19. The negative electrode of claim 8 in which $M^1$ is Mg.

20. The negative electrode of claim 8 in which $M^1$ is Y.

21. The negative electrode of claim 8 in which $M^1$ is Co.

22. The negative electrode of claim 8 in which q is about 0.2 or less.

23. The negative electrode of claim 1 in which $0\leq r<3$.

24. The negative electrode of claim 1 in which (x+r) is about 2.

25. The negative electrode of claim 1, wherein q is $0<q\leq0.5$.

26. A non-aqueous electrolyte secondary battery comprising:
- a positive electrode;
- a negative electrode;
- a non-aqueous electrolyte between the positive electrode and the negative electrode;

in which:
- the non-aqueous electrolyte comprises a non-aqueous solvent and lithium salt;
- the positive electrode comprises a positive electrode current collector, and, on the positive electrode current collector, a mixture comprising a positive electrode active material, a positive electrode conductive material, and a positive electrode binder;
- the positive electrode active material is a compound capable of occluding and of releasing lithium ions; and
- the negative electrode comprises a negative electrode current collector, and on the negative electrode current collector, a mixture comprising a negative electrode active material, a negative electrode conductive material, and a negative electrode binder;
- the negative electrode active material has the overall composition: $AM^1_q M^2_{1-q} O_y$;
- A is $Li_X$ or $Li_{X-r}G_r$, in which G is selected from the group consisting of Na, K, Cs, Be, Mg, Ca, Sr, Ba, and mixtures thereof, in which G and $M^1$ are different;
- $0<x\leq3$; y is 3 or 4; $0<q<1$; and $0\leq r\leq3$; and
- either $M^1$ is selected from the group consisting of Sn, Mg, and mixtures thereof, and $M^2$ is selected from the group consisting of V, Ti, Nb, Mn, Cr, Sb, Zr, W, and mixtures thereof; or $M^1$ is selected from the group consisting of Y, Co, and mixtures of two or more of Y, Co, Sn, and Mg, and $M^2$ is selected from the group consisting of Ti, Nb, Mn, Cr, Sb, Mo, Zr, W, and mixtures thereof.

27. The non-aqueous electrolyte secondary battery of claim 26 in which A is $Li_X$.

28. The non-aqueous electrolyte secondary battery of claim 27 in which in which $M^1$ is selected from the group consisting of Sn, Mg, and mixtures thereof; and $M^2$ is selected from the group consisting of V, Ti, Nb, Mn, Cr, Sb, Zr, W, and mixtures thereof.

29. The non-aqueous electrolyte secondary battery of claim 28 in which x is about 2.

30. The non-aqueous electrolyte secondary battery of claim 27 in which $M^1$ is selected from the group consisting of Y, Co, and mixtures of two or more of Y, Co, Sn, and Mg; and $M^2$ is selected from the group consisting of Ti, Nb, Mn, Cr, Sb, Mo, Zr, W, and mixtures thereof.

31. The non-aqueous electrolyte secondary battery of claim 30 in which x is about 2.

32. The non-aqueous electrolyte secondary battery of claim 27 in which the non-aqueous electrolyte comprises an additive selected from the group consisting of vinylene carbonate, phenyl ethylene carbonate, 1,3-propane sultone, vinyl ethylene carbonate, and mixtures thereof, and the positive electrode active material is $LiCoO_2$, $LiNiO_2$, or $LiMn_2O_4$.

* * * * *